United States Patent [19]
Keinanen

[11] 4,123,646
[45] Oct. 31, 1978

[54] ARC WELDING SYSTEM

[75] Inventor: Henry J. Keinanen, Hickory Hills, Ill.

[73] Assignee: Continental Can Company, Inc., New York, N.Y.

[21] Appl. No.: 656,741

[22] Filed: Feb. 9, 1976

Related U.S. Application Data

[63] Continuation of Ser. No. 436,954, Jan. 28, 1974, abandoned.

[51] Int. Cl.² .............................................. B23K 9/06
[52] U.S. Cl. ................................. 219/137 R; 219/64; 219/130.4; 219/130.51
[58] Field of Search ............... 219/64, 137 PS, 131 R, 219/131 WR, 135, 113, 130.4, 130.51; 315/170, 171, 172, 173, 174, 209 CD, 227 A

[56] References Cited
U.S. PATENT DOCUMENTS

| | | | |
|---|---|---|---|
| 2,759,088 | 8/1956 | Lincoln | 219/137 PS |
| 3,241,218 | 3/1966 | Phillips | 219/131 R |
| 3,249,735 | 5/1966 | Needham | 219/131 R |
| 3,571,558 | 3/1971 | Hogan, Jr. | 219/137 PS |
| 3,657,512 | 4/1972 | Bondarenko | 219/131 R |
| 3,666,906 | 5/1972 | Byrne | 219/131 R |
| 3,780,258 | 12/1973 | Iceland et al. | 219/135 |

Primary Examiner—J. V. Truhe
Assistant Examiner—Shaw
Attorney, Agent, or Firm—Charles E. Brown

[57] ABSTRACT

This disclosure relates to an arc welding system primarily intended to replace present systems utilizing an inert gas atmosphere in which the welding takes place. It is proposed to provide a high voltage, low power ignition supply to produce an arc across a spark gap between electrodes and thus provide an ionized atmosphere in which a welding arc may be produced from a low voltage high power main power source. The main power source may include a capacitor which is constantly charged between actuation of the ignition circuit.

12 Claims, 3 Drawing Figures

ARC WELDING SYSTEM

This is a continuation of application Ser. No. 436,954, filed Jan. 28, 1974 now abandoned.

This invention relates in general to new and useful improvements in arc welding, and more particularly to an arc welding system wherein the benefits of an inert gas welding system are obtained without utilizing the expensive inert gas.

Tungsten inert gas welding systems, known as TIG welding systems, are well known. Such a system provides an electrode holder for a tungsten electrode which has associated therewith a supply of a suitable inert gas. The other electrode is secured to the workpiece. With the welding system in operation, the tungsten electrode is brought closely adjacent to the work so as to effect an arcing within the inert gaseous atmosphere between the tungsten electrode and the work. In the utilization of such a welding apparatus, the workpiece may be melted and used as the welding material or a welding rod may be suitably fed into the area of the arc for melting and incorporation into the work.

TIG welding systems provide excellent results. However, at all times during the welding operation, there must be a flow of the inert gas to provide the necessary shield, and as a result, a considerable volume of relatively expensive gas is required. Therefore, it is highly desirable to be able to obtain the benefits of a TIG welding system without utilizing the inert gas.

In accordance with this invention, it is proposed to eliminate the inert gas of the well known TIG system and to obtain the necessary substantially oxygen-free atmosphere in the form of a protective low pressure gas envelope. It has been found that the necessary protective low pressure gas envelope can be created by producing an arc of a voltage much greater than that required for welding across the arc gap to produce an ionized channel between the usual tungsten electrode and the work.

It has been found that by associating with the high voltage arc a discharge of a capacitor across the arc gap, a shock wave propogates through the gap. A region of lower gas density known as the channel envelope moves in the wake of the shock front, the density in this region being roughly 0.01 of the normal gas density. It has also been found that this condition can last several millseconds after the arc discharge, thus reducing the oxidation rate of a material in contact or near the electrodes.

It has further been found that when the arc is concentrated, the melted spot, which is produced by a pulsed arc, will be cooled to near room temperature before the protective low pressure gas envelope disappears.

With the above and other objects in view that will hereinafter appear, the nature of the invention will be more clearly understood by reference to the following detailed description, the appended claims and the several views illustrated in the accompanying drawings:

Figure 1:
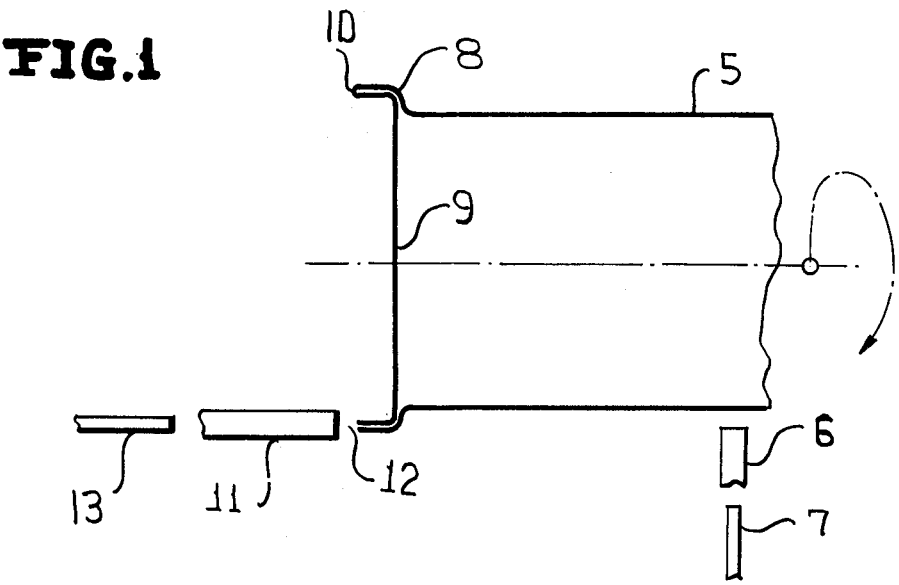
FIG. 1 is a schematic view showing the manner in which an end unit may be welded to a can body utilizing the welding system of this invention.

In accordance with this invention, there has been particularly adapted an arc welding system which may be utilized in the welding together of metal components, particularly thin metal components, such as can components. For example, as is shown in FIG. 1, a can body 5 may be mounted for rotation about its axis in any suitable manner and have attached thereto for supplying electrical current thereto during the rotation thereof an electrode 6 which is connected to a lead 7.

In the illustrated embodiment of the invention, the can body 5 is provided with an enlarged end portion 8 in which there is seated an end unit 9. The end portion 8 and end unit 9 have the free edges thereof adjoining one another and secured together by a weld 10 which is effected by positioning a second electrode 11 adjacent the edges of the body 5 and the end unit 9 and generating an arc across a spark gap 12 between the electrode 11 and the can components. The electrode 11 is attached to a lead 13.

At this time it is pointed out that the electrode 6 is generally considered the grounding electrode and that the electrode 11 will be the usual tungsten electrode.

Figure 2:
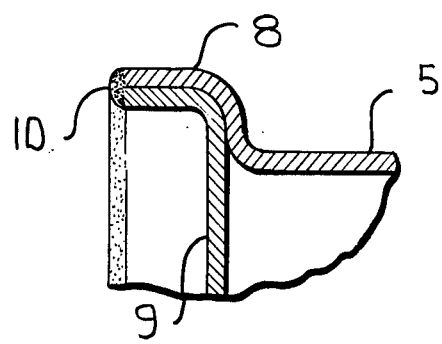
FIG. 2 is an enlarged fragmentary rotated sectional view showing the general nature of the weld formed.

As is shown in FIG. 2, welding of the end unit 9 to the portion 8 of the can body 5 is effected by melting and welding together of the metal of the components as to weld 10.

It is to be understood that normally in order to obtain such a weld with the weld being of high quality, it has been necessary to submerge the weld area in an inert gas. However, in accordance with this invention, the necessity of providing the relatively high cost inert gas is eliminated.

Figure 3:
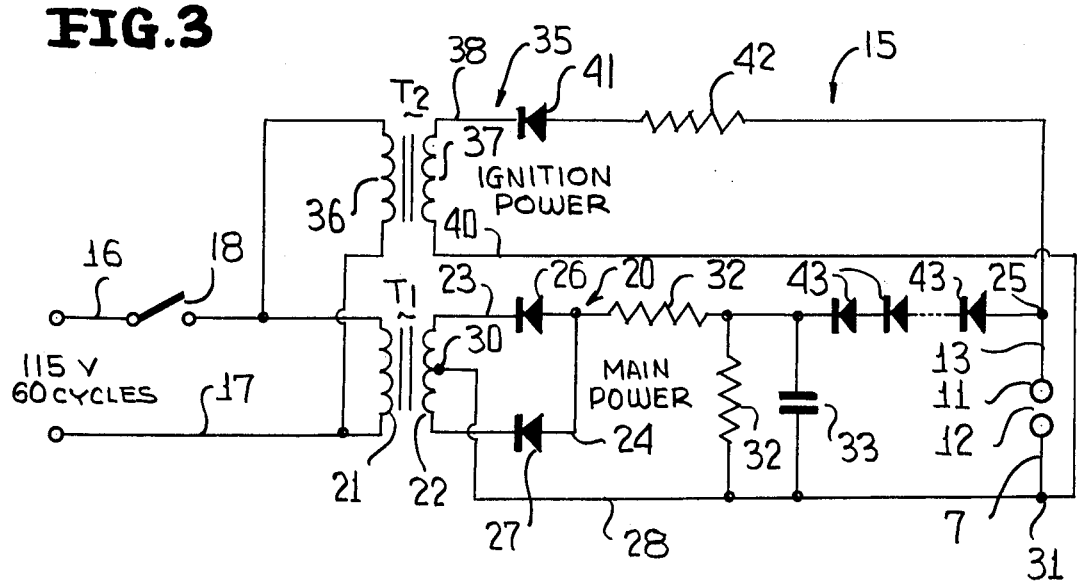
FIG. 3 is a wiring schematic of the arc welding system.

Referring now to FIG. 3, it will be seen that there is illustrated a welding circuit in accordance with this invention which eliminates the necessity of separate means, such as an inert gas envelope, to shield the molten metal against oxidation. The welding circuit, which is generally identified by the numeral 15, includes a pair of leads 16, 17 which are connected to a suitable alternating current power source, such as a conventional 115 volt, 60 cycle power source. One of these leads, such as the lead 16, is provided with a master control switch 18.

The circuit 15 includes a main power circuit, generally identified by the numeral 20, with the main power circuit including a transformer $T_1$. The transformer $T_1$ includes a primary winding 21 which is connected across the leads 16, 17 for receiving power from the power source. The transformer $T_1$ also includes a secondary winding 22 which has extending from opposite ends thereof leads 23 and 24 with the lead 23 being coupled as at 25 to the lead 13 for the welding electrode 11. The lead 23 is provided adjacent the winding 22 with a power flow blocking diode 26. The lead 24 is coupled to the lead 23 downstream of the diode 26 and has incorporated therein a power flow blocking diode 27.

The main power source 20 also includes a lead 28 which is selectively connected to an intermediate tap 30 of the winding 22. The lead 28 is connected as at 31 to the lead 7 for the welding electrode 6.

The lead 23 is provided downstream of the connection between the lead 24 and the lead 23 with a suitable resistor 32. Downstream of the resistor 32 is a resistor 33 which is connected between the leads 23 and 28 and parallel with a capacitor 33. In the operated form of the invention, the capacitance of the capacitor was 400 $\mu$F.

In addition to the main source 20, the welding circuit 15 includes a ignition power source, generally identified by the numeral 35. The ignition power source 35 includes a transformed $T_2$ having a primary winding 36 connected across the leads 16, 17. A secondary winding 37 of the transformer $T_2$ has connected thereto leads 38 and 40. The lead 38 is connected to the welding lead 13 at 25. The lead 40 is connected to the welding lead 7 at 31. The lead 38 has incorporated therein in series a power blocking diode 41 and a suitable resistor 42 for the purpose of limiting the ignition power.

At this time it is pointed out that the transformer $T_1$ is of a construction to provide low voltage and high power to the leads 23, 28 while the transformer $T_2$ is of a construction to provide high voltage and lower power to the leads 38, 40. In order that the high voltage of the ignition power source 35 will not flow back through the circuitry of the main power source 20, there is incorporated in the lead 23 adjacent the connection 25 a plurality of diodes 43 which are arranged in series. These diodes are high voltage-high current diodes. It is also to be noted that the diodes 43 are in series with the capacitor 33.

With the switch 18 in its closed position and the electrode 6 connected to the workpiece, the electrode 11, which is a tungsten electrode, is placed relative to the workpiece to define the required arc gap 12 for welding. The diodes 43 blocking the flow of high voltage from the ignition power source 35 into the circuitry of the main power source 20, the high voltage current from the ignition power source 35 is directed across the arc gap 12 to produce an over-voltage across the arc gap 12. This results in an ionized channel between the electrode 11 and the workpiece through which the main discharge from the main power source 20 can dissipate.

When the over-voltage from the ignition power source 35 appears across the spark gap 12, the capacitor 33 is discharged across the arc gap 12, generating a shock wave which propogates through the gap. A region of lower gas density known as the channel envelope moves in the wake of the shock front; the density in this region is roughly 0.01 of the normal gas density.

It is to be understood that the substantially vaccuum condition will last several milliseconds after the arc discharge, thus holding to a minimum the oxidation rate of the material being welded. It is well known that the electric arcing surface heating of metals in transfer arc mode provides good arc to workpiece heat transfer characteristics. The heat rise on the metal surface is approximately 100° C. per microsecond, thus the melting temperature of steel (1535° C.) can be reached in 15-20 microseconds. The heat input to the surface being welded is approximately 100 times greater than the heat loss from the surface by conduction. The radiation losses are insignificant. Therefore, the material surrounding the melted spot remains at a relatively low temperature, thus providing a very effective heat sink. It is feasible that the melted spot produced by a pulsed arc will be cooled to near room temperature before the protective low pressure gas envelope created by the arc disappears.

Like workpieces have been welded utilizing both commercial tungsten inert gas equipment and the welding equipment described above in air, and the quality of both welds is similar and, in fact, it is extremely difficult to differentiate between the quality of the two welds. The welds in both instances are smooth, high quality welds.

Although the example circuit 15 utilizes a 115 volt, 60 cycle power supply, it is to be understood that this power supply is only given as an example of a practical power supply and may widely varied. For example, the system may be modified to operate at a higher repetition rate. It is to be understood that which each pulsing of energy through the welding circuit there is a firing of the ignition power source 35 across the arc gap 12 followed by the discharge of the capacitor 33 across that arc gap. The capacitor 33 is then immediately recharged and then discharged when the next over voltage appears across the arc gap 12.

It is also to be understood that the power source may be varied as to voltage in addition to cycles. Finally, it is to be understood that a pulsed direct current power supply could be utilized.

Although only a preferred embodiment of the invention has been specifically illustrated and described herein, it is to be understood that minor variations may be made in the welding circuitry without departing from the spirit and scope of the invention, as defined by the appended claims.

I claim:

1. A method of arc welding a material in the absence of a protective agent, said method comprising the steps of:
   (a) providing a welding electrode and a workpiece comprising a pair of electrodes defining a spark gap there-between;
   (b) repetitively applying to said pair of electrodes at a given cyclic rate and during alternate half cycles thereof, a high-voltage pulse of greater voltage than required for welding so as to produce across said gap, at a given instant during each of said alternate half cycles, an over-voltage of such magnitude as to create an ionized channel between said pair of electrodes; and
   (c) applying to said pair of electrodes, at said given cyclic rate and at said given instant within each of said alternate half cycles, a high current welding current impulse of such magnitude as to effect welding of said material and of such impulse duration as to produce a shock wave propagating across said gap, whereby a substantially vacuum condition is created and maintained within said gap so as to minimize oxidation of said material during welding in the absence of a protective agent.

2. The method of claim 1 wherein step (c) includes the steps of:
   providing a fast discharge capacitor connected in parallel to said pair of electrodes;
   applying a low voltage, high current pulse to said capacitor at said given cyclic rate and during each half cycle thereof so as to develop a discharge voltage across said gap at said given instant; and
   discharging said capacitor through said ionized channel at said given instant whereby to produce said shockwave propagating across said gap.

3. The method of claim 2 including the additional step of blocking the flow of said low current, high voltage pulses to said fast discharge capacitor during step (c).

4. The method of claim 1 wherein step (a) includes providing thin-wall can body components as said workpiece.

5. An improvement in arc welding apparatus, said improvement comprising an arc welding system for welding a material in air in the absence of a protective agent for an extended period including in combination:
   a welding electrode and a workpiece comprising a pair of electrodes defining a spark gap in air;

pulsing means coupled directly to said pair of electrodes for repetitively applying thereto for an extended period, at a given cyclic rate and during alternate half cycles thereof, a high-voltage pulse of greater voltage than required for welding so as to produce across said gap, at a given instant during each of said alternate half cycles, an over-voltage of such magnitude as to create an ionized channel in the air between said pair of electrodes; and low voltage high current welding current impulse means coupled directly to said pair of electrodes and operatively associated with said pulsing means for applying to said pair of electrodes, at said given cyclic rate and only at said given instant during each of said alternate half cycles, a high-current welding current impulse of such magnitude as to effect welding of said material and of such impulse duration as to produce a shock wave propagating through said ionized channel across said gap, whereby a substantially vacuum condition is created and maintained within said gap so as to minimize oxidation of said material during welding in the absence of a protective agent.

6. The arc welding system of claim 5 wherein said welding current impulse means includes:

additional pulsing means coupled to said pair of electrodes and operatively associated with said pulsing means for generating low voltage, high current pulses at said given cyclic rate and during each half cycle thereof; and capacitor means connected in parallel between said additional pulsing means and said pair of electrodes for receiving said low voltage, high current pulses so as to develop a discharge voltage across said gap at said given instant, and for dissipating said discharge voltage through said ionized channel during said impulse duration whereby to provide said high current welding current impulses to said pair of electrodes.

7. The arc welding system of claim 5 wherein said welding current impulse means includes:

additional pulsing means coupled to said pair of electrodes and operatively associated with said pulsing means for generating low voltage, high current pulses at said given cycle rate and during each half cycle thereof; and capacitor means connected in parallel between said additional pulsing means and said pair of electrodes for receiving said low voltage, high current pulses so as to develop a discharge voltage across said gap at said given instant and for dissipating said discharge voltage through said ionized channel during said impulse duration whereby to provide said high current welding current impulses to said pair of electrodes;

including blocking means coupled between said pair of electrodes and said capacitor means for blocking said high voltage pulses from entering said additional pulsing means.

8. The arc welding system of claim 7 wherein said blocking means is a plurality of high voltage, high current diodes.

9. The arc welding system of claim 5 including blocking means coupled between said pair of electrodes and said welding current impulse means for blocking said high voltage pulses from entering said welding current impulse means.

10. The arc welding system of claim 9 wherein said blocking means is a plurality of high voltage, high current diodes.

11. The arc welding system of claim 9 wherein said blocking means is a plurality of high voltage, high current diodes arranged in series.

12. The arc welding system of claim 5 wherein one of said electrodes is in the form of thin-walled can body components to be welded together.

* * * * *